Figure 1:
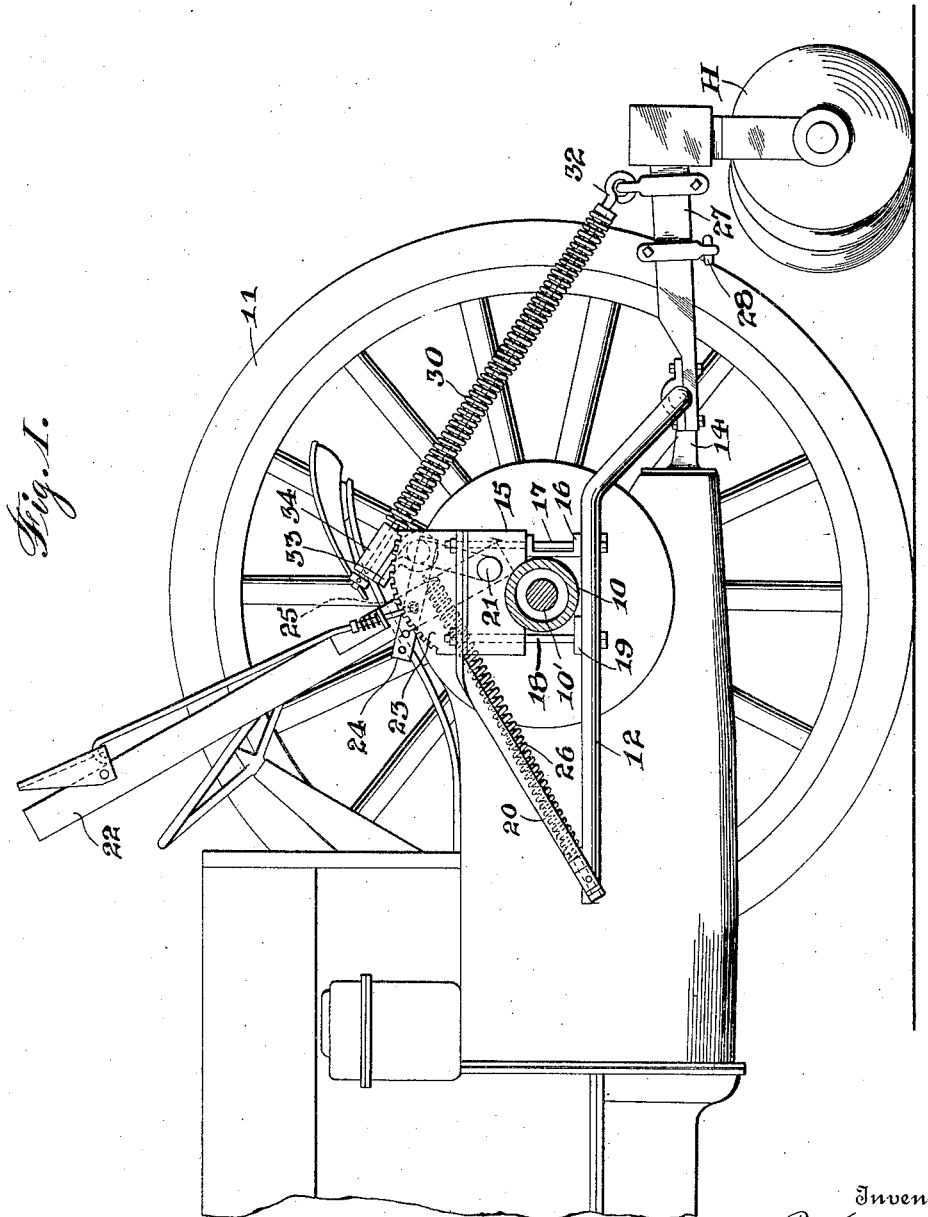

Sept. 23, 1924.

J. Q. BILLINGS

TRACTOR ATTACHMENT

Filed April 18, 1923

1,509,749

2 Sheets-Sheet 1

Inventor
Josiah Q. Billings

By Mason, Fenwick & Lawrence
Attorneys

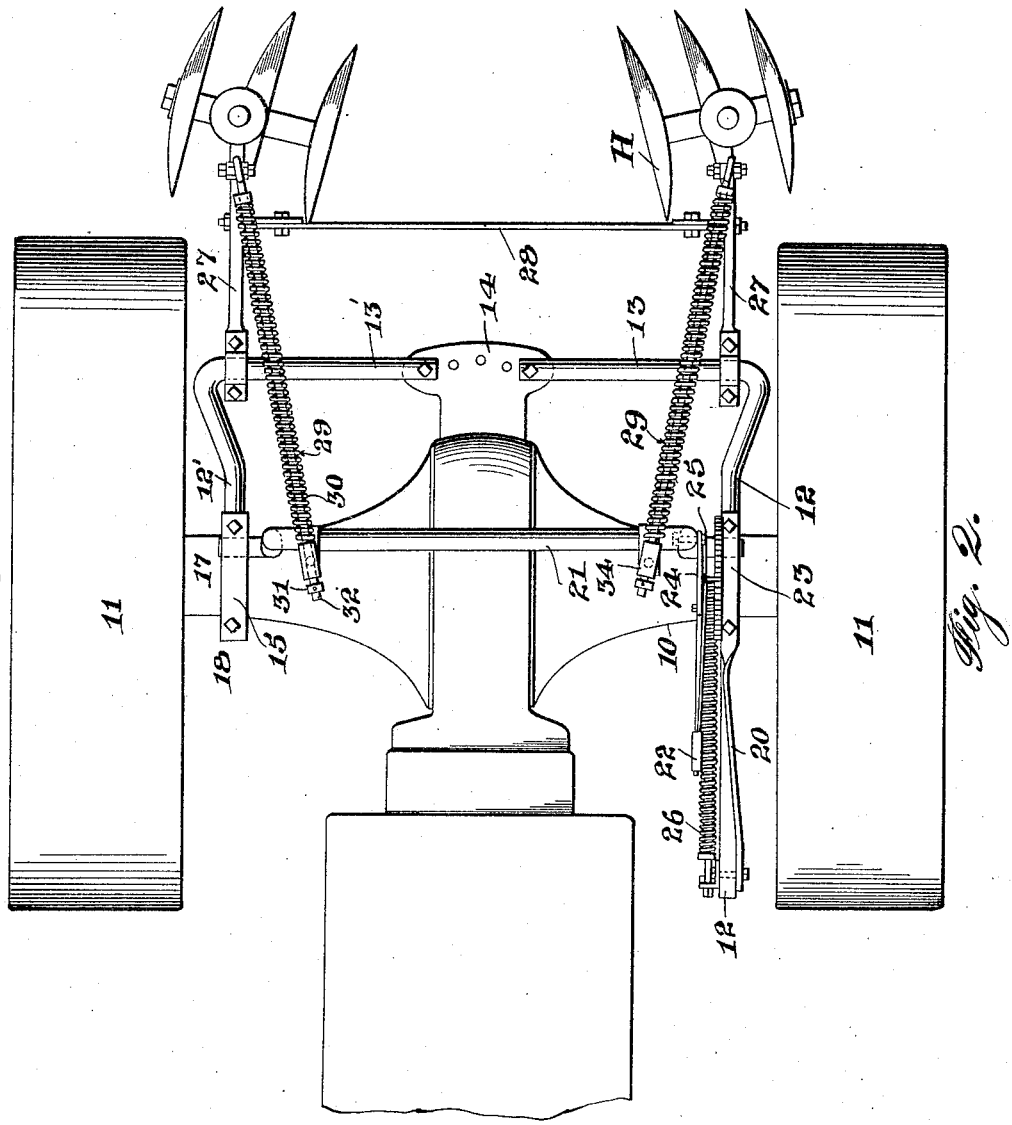

Patented Sept. 23, 1924.

1,509,749

UNITED STATES PATENT OFFICE.

JOSIAH QUINCY BILLINGS, OF SHREVEPORT, LOUISIANA.

TRACTOR ATTACHMENT.

Application filed April 18, 1923. Serial No. 632,955.

*To all whom it may concern:*

Be it known that I, JOSIAH Q. BILLINGS, a citizen of the United States, residing at Shreveport, in the parish of Caddo and State of Louisiana, have invented certain new and useful Improvements in Tractor Attachments; and I do hereby declare the following to be a full, clear, and exact description of the invention, such as will enable others skilled in the art to which it appertains to make and use the same.

This invention has for its object to provide a mechanism whereby agricultural implements can be attached to and drawn along by a tractor. It is a more specific object of invention to provide a mechanism which is simple in construction and will stand up to the hard usage necessarily received by devices of the character indicated.

The various novel features of the invention will appear from the detailed description taken in connection with the accompanying drawings forming part of this specification.

In the drawings Fig. 1 is a side elevation of the invention as applied to a well known type of tractor, the near wheel of the latter being removed and a cross section taken through the rear axle housing; and Fig. 2 is a plan view of the arrangement shown in Fig. 1.

In the drawings numeral 10 indicates the rear axle housing of a well known type of tractor and 11 the wheels at the ends of the housing. The live axle within the housing 10 is indicated by reference character 10'. Extending rearward from the housing 10 adjacent either end thereof and below the same is a draw-bar in the form of a bail-like member the sides of which are indicated by reference characters 12 and 12'. The side 12' extends forward of the housing for a purpose that will presently appear. The draw-bar at its loop comprises angular extensions 13 and 13' and the adjacent terminals thereof are preferably secured to a tail-like extension 14, which is suitably affixed to the tractor.

While the invention is shown as applied to a tractor of the wheel type, it may be stated that it is equally applicable to tractors of the endless track type. Mounted on the housing 10 at either end thereof are saddle blocks 15. Disposed between each of the saddle blocks 15 and the draw-bar sides is a spacer 16 and bolts 17 and 18 securely ties said parts together on the housing. bolt 18 is spaced from the housing sufficiently far to insure that it will not be drawn rearward thereagainst by the drag of the implements. A stop in the nature of a small block 19 may be disposed between the draw-bar sides and housing and secured in place therebetween by means of the bolt 18 passing there-through.

Extending between the forward terminal of one of the draw-bar side 12 and the top of the adjacent saddle block 15 is a strap-iron brace 20 which is preferably secured to the saddle block by means of the said bolts 17 and 18.

Disposed over the housing 10 is a crank shaft 21 the free ends of which are supported by the said saddle blocks in suitable openings extending there-through. At one end of the crank shaft is a hand lever 22 adapted to be adjustably locked to a sector rack 23. This sector rack is mounted on the adjacent saddle block 15 and is held in place thereon by means of the bolts 17 and 18 passing through a flange on the said rack. The handle 22 is adapted to be angularly adjusted with respect to said shaft and for this purpose there is mounted on the crank portion of the crank shaft a link 24 having a plurality of openings at its free end through one of which, and the hand lever 22, a securing bolt 25 may be passed, as will be readily understood.

For simplicity of construction I prefer to secure the said link 24 in position on the crank shaft by means of a set screw or pin 25 projecting axially from the end of the crank portion.

Extending between the forward end of the draw-bar side 12 and the crank of the crank shaft is a retraction spring 26. The end of the spring adjacent the crank shaft is preferably anchored to the link 24 and the other end is anchored in any suitable manner at the forward end of the bar 12.

Mounted on the angular extensions 13 and 13' of the draw-bar is a pair of implement-connecting arms 27, the free ends of which are adapted to be suitably connected or coupled to an agricultural implement or other implement to be drawn by the tractor. As an illustration disc harrows H have been shown as connected to said arms.

Extending between the arms 27 is an adjustable spacing and bracing member 28.

The arms 27 are swingably mounted on the draw-bar and are adapted to be swung thereon by actuation of the crank shaft 21. Extending between the crank shaft and the free ends of the arms 27 are cushioned pitmans 29 which will permit the arms to independently swing upwardly should the implements carried thereby pass over obstructions. Such independent upward swinging would occur against the tension of the cushion element such as a coil spring 30 forming part of the cushioned pitman. In the particular type of cushioned pitman shown the tension of the spring may be adjusted by varying the position of the nut 31 on the end of the rod 32 which comprises a rigid part of the pitman.

The coupling between the crank shaft and the pitman may be of any suitable type. For the purpose of illustration the coupling is shown as a strap-iron 33 looped around the shaft and including a cored body 34 pivotally mounted on the free ends of the said strap-iron 33, the rod 32 passing through the cored body or block 34.

From the above described construction it will be seen that I have provided a simple and sturdy device which may be readily secured to the rear axle housing of a tractor. By reason of the forward extension of one of the sides of the draw-bar a simple and inexpensive anchoring means for one end of the retraction spring 26 is provided and furthermore the said point of anchorage is readily braced by the bar 20. It may be stated that the function of the retraction spring 26 is to assist the operator in swinging the crank shaft to elevate the implements at the ends of the swingable arms 27.

It may be further pointed out that by utilizing the link 24 which extends between the hand lever 22 and the crank shaft as an anchorage for the other end of the spring 26 there is obtained a further simplification of construction of the device.

While I have described the preferred form of the invention with considerable particularity of detail it will be apparent that various changes in details may be resorted to without departing from the spirit of the invention, as defined in the amended claims.

What I claim is:

1. The combination with the rear axle housing of a tractor, of a bail-like draw-bar extending rearward of the housing from either end thereof and below the same, means securing the side bars of the draw-bar to the housing, one of the said side bars extending forward of the housing, a brace extending from the top of the said housing to the terminal of the forwardly extending side bar, and means for coupling implements to the draw-bar.

2. The combination as in claim 1, further characterized by saddle blocks seated on top of said housing adjacent either end thereof, and common means securing the side bars, brace and blocks to the said housing.

3. The combination as in claim 1, further characterized by a hand-turnable crank shaft disposed over the said housing, saddle blocks in which the ends of the shaft are supported, and pitmans extending between the crank shaft and the implement-connecting means.

4. The combination with the rear axle housing of a tractor, of a bail-like draw-bar extending rearward of the housing from either end thereof and below the same, means securing the side bars of the draw-bar to the housing, one of the said side bars extending forward of the housing, a brace extending from the top of the said housing to the terminal of the forwardly extending side bar, a hand-turnable crank shaft disposed over the said housing, saddle blocks in which the ends of the shaft are supported, and pitmans extending between the crank shaft and the implement-connecting means.

5. The combination as in claim 4, further characterized by a retraction spring between the crank shaft and the end of the forwardly projecting side bar.

6. In a tractor attachment, the combination with the rear axle thereof, of a crank shaft mounted parallel therewith, a hand lever, means permitting variable angular adjustment between said lever and crank shaft including a link adjustably connecting the two, a spring anchored at one end to said link, and a second anchorage for said spring at a point removed from the link anchorage.

7. The combination with the rear axle housing of a tractor, of a bail-like draw-bar secured thereto and having one of its sides extended forward of the said housing, a crank shaft disposed over the housing, a hand lever mounted on the said shaft, a link adjustably connecting the lever and said shaft, a retraction spring anchored at one end to the said link and at its other end to the forwardly extending side bar of the draw-bar, and means mounted as the draw-bar adapted to be actuated by operation of the crank shaft.

In testimony whereof I affix my signature.

JOSIAH QUINCY BILLINGS.